United States Patent
Hara et al.

(10) Patent No.: US 10,527,408 B2
(45) Date of Patent: Jan. 7, 2020

(54) MISALIGNMENT DETECTING DEVICE FOR SPOKED WHEEL

(71) Applicant: HOZAN TOOL INDUSTRIAL CO., LTD, Osaka (JP)

(72) Inventors: Tomomi Hara, Yokohama (JP); Hiroshi Udagawa, Yokohama (JP); Rikio Kurakane, Yokohama (JP); Saburo Shimokawa, Yokohama (JP); Masahiro Okuno, Osaka (JP)

(73) Assignee: HOZAN TOOL INDUSTRIAL CO., LTD., Osaka (JP)

( * ) Notice: Subject to any disclaimer, the term of this patent is extended or adjusted under 35 U.S.C. 154(b) by 0 days.

(21) Appl. No.: 16/064,722

(22) PCT Filed: Jul. 27, 2016

(86) PCT No.: PCT/JP2016/072084
§ 371 (c)(1),
(2) Date: Jun. 21, 2018

(87) PCT Pub. No.: WO2017/110125
PCT Pub. Date: Jun. 29, 2017

(65) Prior Publication Data
US 2018/0306572 A1    Oct. 25, 2018

(30) Foreign Application Priority Data
Dec. 24, 2015 (JP) ................ 2015-252248

(51) Int. Cl.
G01B 11/16 (2006.01)
B60B 31/02 (2006.01)
G01M 1/14 (2006.01)

(52) U.S. Cl.
CPC ............. *G01B 11/16* (2013.01); *B60B 31/02* (2013.01); *G01M 1/14* (2013.01); *B60B 2900/541* (2013.01)

(58) Field of Classification Search
CPC ........ G01B 11/16; G01B 11/26; G01B 11/275
(Continued)

(56) References Cited

U.S. PATENT DOCUMENTS 2,613,447 A * 10/1952 Brouwer ................ G01B 5/255
33/203.16
4,143,464 A * 3/1979 Lahos .................... G01B 5/255
33/203.16
(Continued)

FOREIGN PATENT DOCUMENTS

EP    1-094-295    4/2001
EP    2161558 A1 * 3/2010 ............. B60B 31/02
(Continued)

OTHER PUBLICATIONS

Notification Concerning Transmittal of International Preliminary Report of Patentability—PCT/IB/326 dated Jul. 5, 2018.
(Continued)

*Primary Examiner* — Roy M Punnoose
(74) *Attorney, Agent, or Firm* — Smith, Gambrell & Russell, LLP

(57) ABSTRACT

There is provided a misalignment detecting device being capable of detecting and correcting distortion of a spoked wheel with a simple configuration. The misalignment detecting device includes: supporting frames 12a, 12b to which the spoked wheel 30 to be inspected is set; a first light source 13 that is attached to the supporting frame and irradiates first detected light to the spoked wheel set on the supporting frame in an axial direction of the spoked wheel; a first line sensor 14 that is attached to the supporting frame so as to be capable of receiving the first detected light and detects radial distortion of the spoked wheel without contact based on the received first detected light; a second light source 15 that is attached to the supporting frame and irradiates second detected light to the spoked wheel set on the supporting frame in a direction intersecting the axial direction of the spoked wheel; and a second line sensor 16 that is attached to the supporting frame so as to be capable of receiving the second detected light and detects axial distortion of the spoked wheel without contact based on the received second detected light.

6 Claims, 8 Drawing Sheets

(58) Field of Classification Search
USPC .............................. 356/139.09, 601, 138, 155
See application file for complete search history.

(56) References Cited

U.S. PATENT DOCUMENTS

| | | | | |
|---|---|---|---|---|
| 5,074,048 A | * | 12/1991 | Yokomizo | G01B 7/28 |
| | | | | 33/203.13 |
| 5,103,414 A | * | 4/1992 | Papadopoulos | G01L 5/042 |
| | | | | 33/203.16 |
| 5,636,026 A | * | 6/1997 | Mian | B61K 9/12 |
| | | | | 250/224 |
| 5,827,964 A | * | 10/1998 | Douine | G01B 11/08 |
| | | | | 73/466 |
| 2009/0020231 A1 | | 1/2009 | Rugel | |
| 2009/0284804 A1 | | 11/2009 | Matsuda et al. | |

FOREIGN PATENT DOCUMENTS

| | | | | |
|---|---|---|---|---|
| JP | 07-73962 | 8/1995 | | |
| JP | 8-29642 | 3/1996 | | |
| JP | 10-62126 | 3/1998 | | |
| JP | 2007-170955 | 7/2007 | | |
| WO | 97-45712 | 5/1997 | | |
| WO | WO-9745712 A1 * | 12/1997 | ............. | B60B 31/02 |

OTHER PUBLICATIONS

International Preliminary Report on Patentability—PCT/IB/373.
Written Opinion of International Searching Authority—PCT/ISA/237 with Translation.
Notification of Transmittal of Translation of the International Preliminary Report on Patentability—PCT/IB/338.

* cited by examiner

FIG. 5 (A)
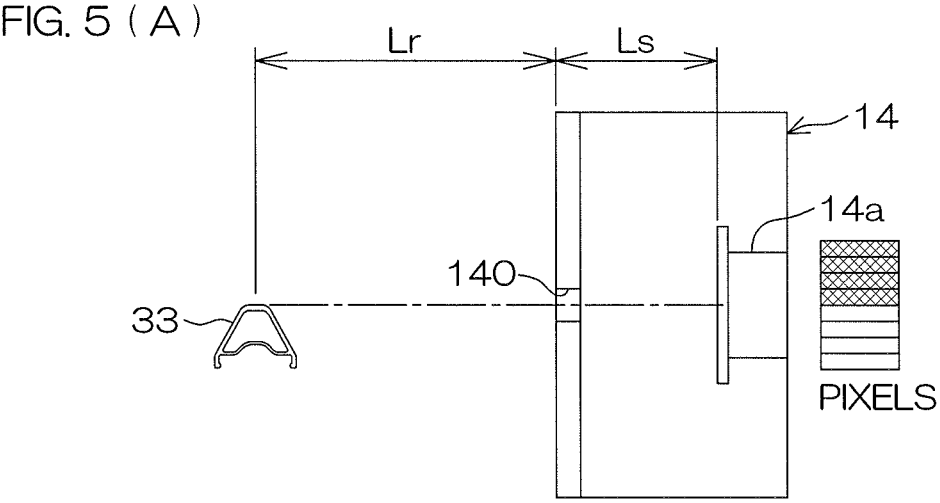
FIG. 5 (B) State displaced downward
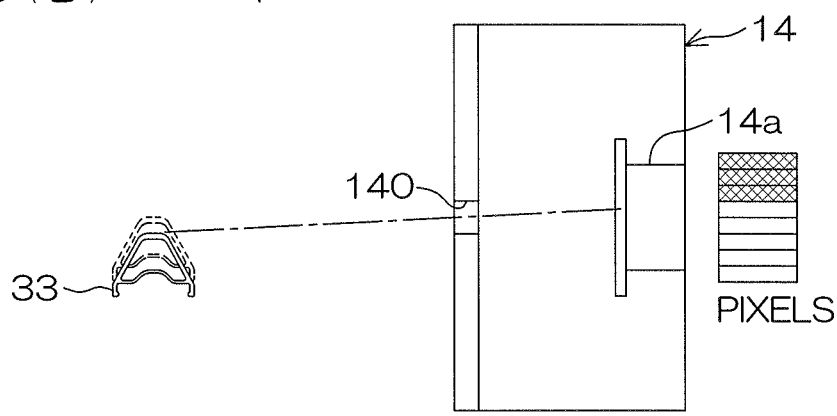
FIG. 5 (C) State displaced upward
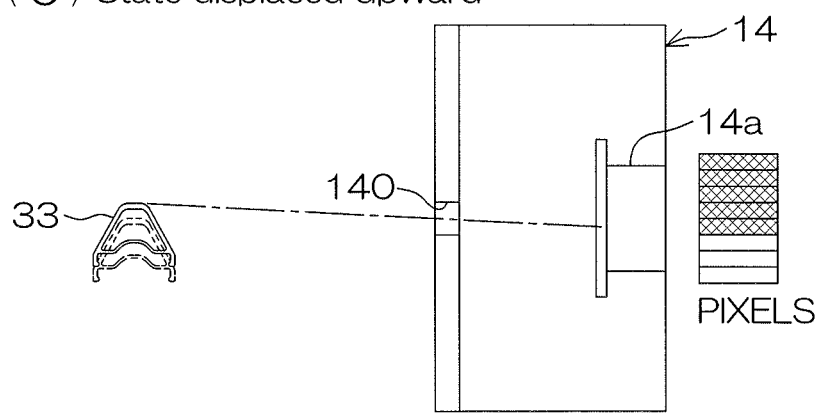

MISALIGNMENT DETECTING DEVICE FOR SPOKED WHEEL

TECHNICAL FIELD

This invention relates to a misalignment detecting device for a spoked wheel.

BACKGROUND ART

A spoked wheel includes a hub in a rotation center portion, a rim surrounding the hub with a regular interval, and a number of spokes linking the hub and the rim and has a configuration where a tire is attached to an outer circumference of the rim. A wheel of a bicycle which is a representative of this spoked wheel has recently shown significant advancement in a shape and a material of a rim. For example, there is commercialized a rim formed of an aluminum alloy, carbon fibers, and the like for weight saving. Further, there is a rim that omits, by employing a disk brake and the like, an annular surface conventionally provided on a side surface of the rim to be press-contacted by a brake pad and has a thin radial thickness. Further, there is available a rim a surface of which is provided with various logos and design patterns.

In a spoked wheel, a hub in a rotation center portion and a rim surrounding its circumference are linked by a number of spokes. Therefore, it is known that when linking tensions, lengths, and the like of respective spokes are not appropriately adjusted, the rim is distorted in a rotational axis direction to the hub being the rotation center and a radial direction dimension from the hub to the rim is inconsistent and distorted in a circumferential direction.

Accordingly, there have been conventionally proposed various devices of detecting distortion of a rim in a spoked wheel called a truing stand or a shake detecting device detecting a distortion of a rim.

PRIOR ART DOCUMENT

Patent Document

Patent document 1: Japanese Examined Patent Publication No. H07-73962
Patent document 2: Japanese Examined Patent Publication No. H08-29642
Patent document 3: US Patent Application Publication No. 2009/0020231A1
Patent document 4: European Patent No. 1094295A2

SUMMARY OF THE INVENTION

Subject to be Solved by the Invention

Conventional shake detecting devices of a spoked wheel disclosed in Patent documents 1 and 2 employ a configuration where the spoked wheel is rotatably set with a hub centered and shake of a rim at a time of rotating the spoked wheel is detected by a detection probe, a detection roller, or the like which can contact the rim.

As a result, when the rim is distorted, the rim inevitably contacts at a distorted position the detection probe or the detection roller. When a surface of the rim is provided with a design pattern and the like, such a contact may cause a damage such as an abrasion on this design pattern. Further, a layer of printing ink partially heaped on the surface of the rim is erroneously detected as the rim is distorted by a thickness of the layer.

On the other hand, devices disclosed in Patent documents 3 and 4 detect shake of a rim without touching the rim. However, contactless sensors disclosed in Patent documents 3 and 4 have a complicated configuration and expensive.

This invention has been developed to solve problems of conventional techniques, and a subject thereof is to provide a misalignment detecting device being capable of accurately detecting distortion of a spoked wheel with a simple configuration.

Solution to Problem

The invention for achieving the above subject is a misalignment detecting device of a spoked wheel, including: a supporting frame to which the spoked wheel to be inspected is set; a first light source that is attached to the supporting frame and irradiates first detected light to the spoked wheel set on the supporting frame in an axial direction of the spoked wheel; a first line sensor that is attached to the supporting frame so as to be capable of receiving the first detected light and detects radial distortion of the spoked wheel without contact based on the received first detected light; a second light source that is attached to the supporting frame and irradiates second detected light to the spoked wheel set on the supporting frame in a direction intersecting the axial direction of the spoked wheel; and a second line sensor that is attached to the supporting frame so as to be capable of receiving the second detected light and detects axial distortion of the spoked wheel without contact based on the received second detected light.

The spoked wheel can include a hub serving as a rotation center, a rim surrounding a circumference of the huh with a predetermined interval, and a plurality of spokes one ends of which are secured to the hub and other ends of which are connected to the rim, the first line sensor detects a radial distortion of the rim to the hub and includes a plurality of photoelectric conversion elements arranged linearly in the radial direction of the rim, and the second line sensor detects an axial distortion of the rim to the hub and includes a plurality of photoelectric conversion elements arranged linearly in a direction intersecting the radial direction of the rim.

Each of the first line sensor and the second line sensor can include a pinhole lens for forming on a photoelectric conversion element surface an image of an object by the detected light.

The first line sensor outputs can output a trigger signal that is associated with a position of die rim to which each of the other ends of the plurality of spokes is connected and that instructs reading of detected light at the associated position.

The invention can include a reference position sensor detecting a reference position of the rim of the spoked wheel set on the supporting frame, and processing means imparting, based on an output of the reference position sensor, a spoke number to the position associated to the rim position to which each of the other ends of the plurality of spokes is connected.

The invention can include a supporting frame to which the spoked wheel to be inspected is set; a first light source that is attached to the supporting frame and irradiates first detected light to the spoked wheel set on the supporting frame in an axial direction of the spoked wheel; and a first line sensor that is attached to the supporting frame so as to be capable of receiving the first detected light and detects radial distortion of the spoked wheel without contact based on the received first detected light.

The invention further can be provided with processing means that performs predetermined calculation based on outputs of the first line sensor and the second line sensor and an output of the processing means and outputs for each spoke an adjustment value by which a tension is to be adjusted.

Advantageous Effects of the Invention

According to this invention, distortion of a rim can be accurately detected with a simple configuration. Further, at a time of detecting distortion, the rim does not receive a scar or a damage. Thus, a misalignment detecting device can be produced with a relatively low price, and it can be expected that a misalignment detecting device being capable of performing accurate detection is widely used in bicycle stores. As a result, this contributes to safety and wide use of bicycles.

BRIEF DESCRIPTION OF THE DRAWINGS

FIG. 5 are explanatory drawings of a measurement principle common to a first sensor 14 and a second sensor 16.

DESCRIPTION OF EMBODIMENTS

In the following, one embodiment of this invention is specifically described referring to drawings.

Figure 1:
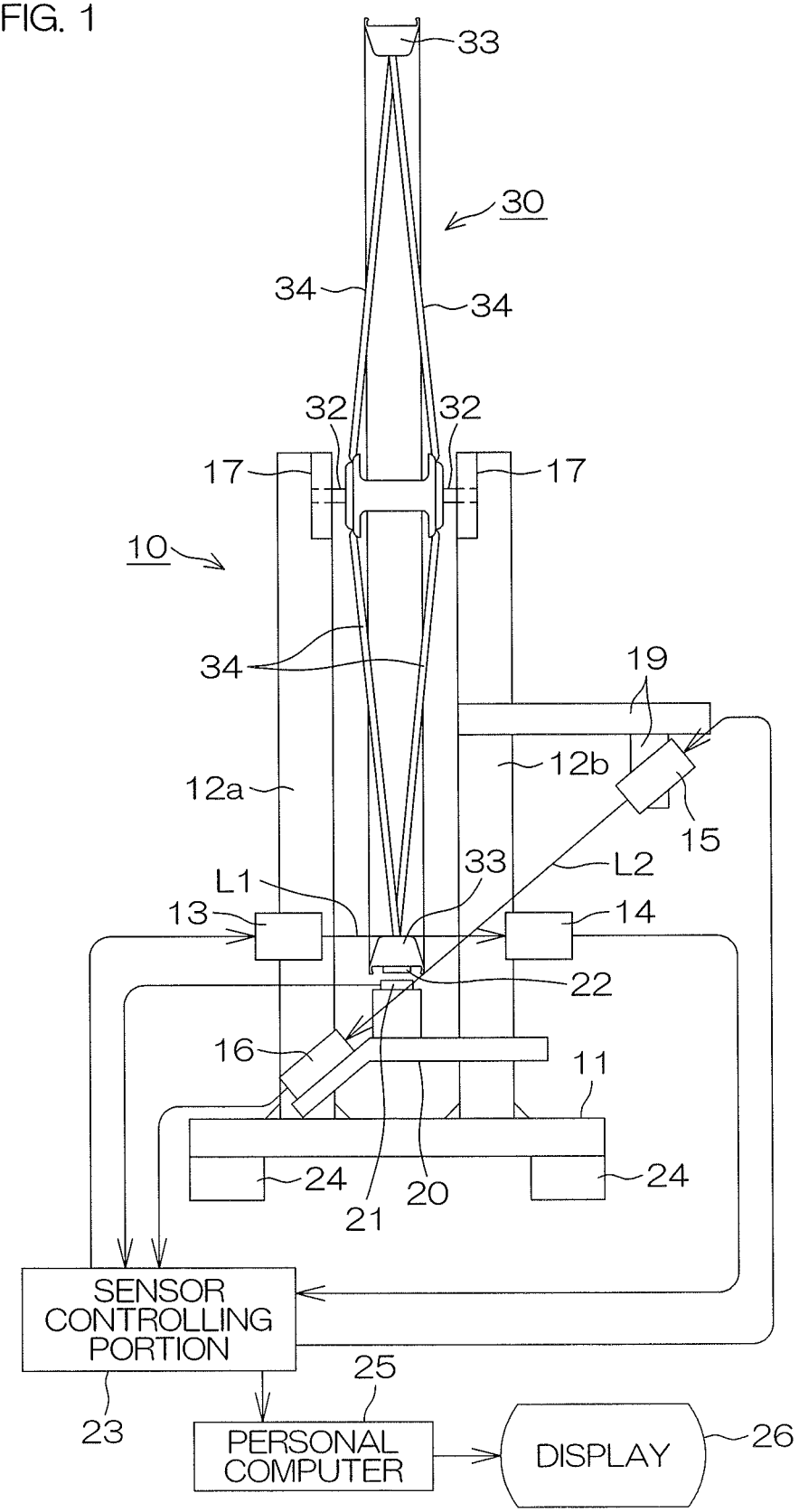
FIG. 1 shows a configuration example of a misalignment detecting device 10 of a spoked wheel according to one embodiment of this invention.

FIG. 1 shows a configuration example of a misalignment detecting device 10 of a spoked wheel according to one embodiment of this invention. The misalignment detecting device 10 is usually also called a truing stand and is a tool for wheel adjustment provided in a bicycle store and the like.

A bicycle store usually receives wheels of bicycles to be sold as groups of parts such as hubs, rims, and spokes. Thus, wheel assembly is performed by assembling these parts, and an assembled wheel (spoked wheel) is adjusted by using a truing stand, a rim center gauge, and the like. Further, in these days makers sometimes ship assembled wheels called "pre-built wheels." However, it is desirable for a bicycle store in view of selling a safe bicycle to perform misalignment detection just to be safe and, if needed, to make correction with respect to a "pre-built wheel" before selling.

The misalignment detecting device 10 shown in FIG. 1 includes a base 11, a pair of props 12a, 12b set up on the base 11, a first light source 13 attached to the prop 12a, a first sensor 14 attached to the prop 12b and being capable of receiving first detected light L1 irradiated by the first light source 13, a second light source 15 attached to the prop 12b, and a second sensor 16 attached to the prop 12b and being capable of receiving second detected light L2 irradiated by the second light source 15.

As described below, the first sensor 14 and the second sensor 16 comprise line sensors and are devised to be able to perform distortion detection with high precision while having a simple and inexpensive configuration.

Figure 2:
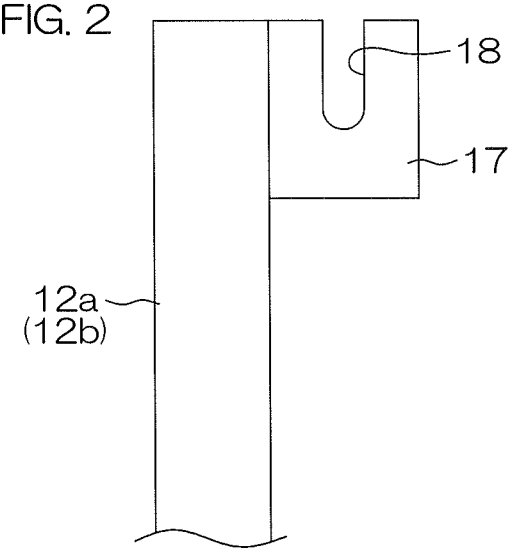
FIG. 2 shows an example of a hub receiving portion 17.

The pair of props 12a, 12b are spaced at a regular interval so as to set the spoked wheel 30 therebetween. A hub receiving portion 17 is fixed to each upper end of the pair of props 12a, 12b. As shown in FIG. 2, the hub receiving portion 17 may be configured by a metal plate 17 secured to one side of the upper end of the prop 12a, 12b. A receiving groove 18 extending downward from an upper edge is formed on the metal plate (hub receiving portion) 17. A wheel shaft 32 protruding from a hub 31 to opposite sides is engaged in this receiving groove 18. Thus, the spoked wheel 30 is set to the props 12a, 12b.

Figure 3:
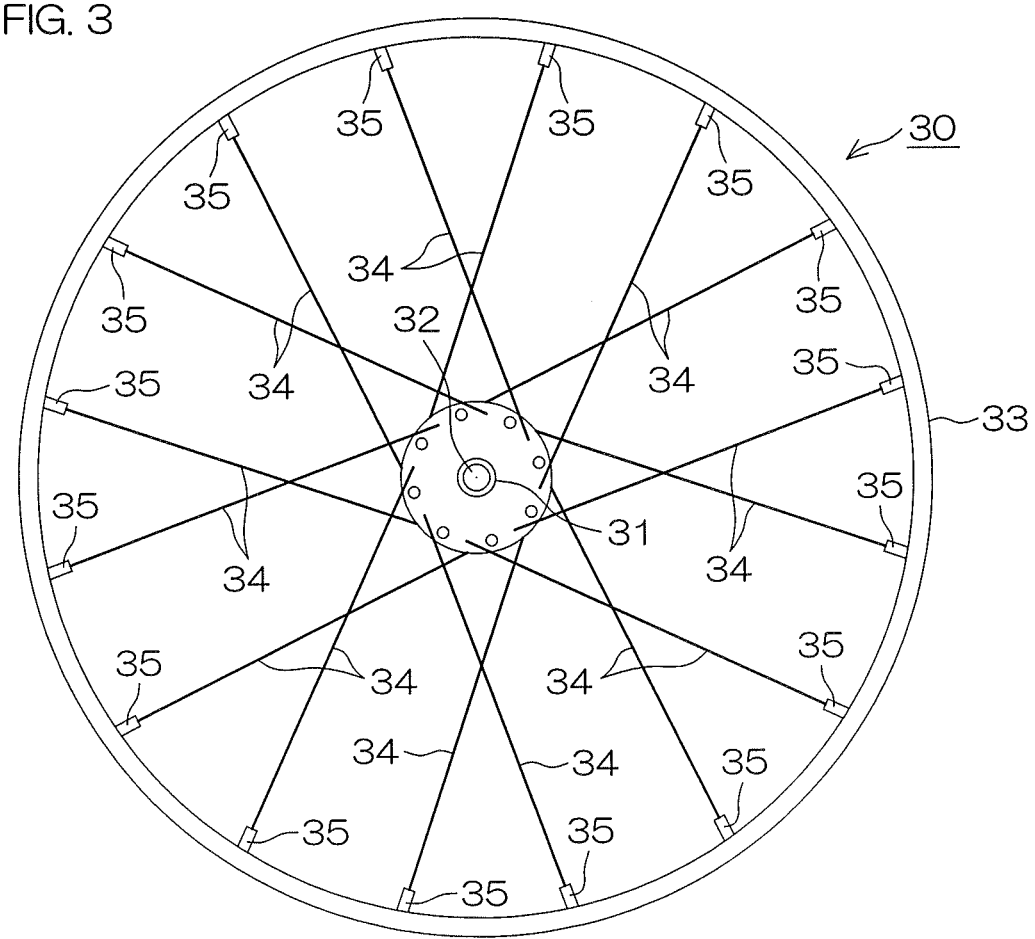
FIG. 3 shows a configuration example of a typical spoked wheel 30.

Referring to FIG. 3, the spoked wheel 30 to be inspected typically comprises the hub 31 serving as a rotation center, a rim 33 surrounding a circumference of the hub 31 with a predetermined interval (regular dimension in a radial direction), and a plurality of spokes 34 one ends of which are secured to the hub 31 and the other ends of which are connected to the rim 33. Further, each spoke 34 can adjust a degree of tension of the spoke 34 at a side of the other end connected to the rim 33 by tightening or loosening a fastening screw 35. The degrees of tension of the plurality of spokes 34 need to be appropriate. If not, the rim 33 is distorted in the radial direction or in an axial direction with respect to the hub 31 being the rotation center. Particularly in a sport wheel where the rim 33 is formed of an aluminum alloy or carbon fibers, a strength and an inertia force of the spoked wheel need to be increased by setting higher the degrees of tension of the spokes 34. Therefore, the degrees of tension of the respective spokes 34 need to be adjusted accurately. When the adjustment is insufficient, the rim 33 is distorted and a failure such as reduction of a rotation performance and traveling performance evidently appears.

Referring to FIG. 1 again, the first light source 13 and the first sensor 14 are to detect presence or absence of radial distortion of the rim 33 of the set spoked wheel 30. Attachment positions (attachment heights) of the first light source 13 and the first sensor 14 with respect to the props 12a, 12b are adjusted such that the light L1 output from the first light source 13 is irradiated in a vicinity of an inner radial surface of the rim 33 and this light L1 is received at the first sensor 14. Further, positions of the first light source 13 and the first sensor 14 in a height direction are slidable with respect to the props 12a, 12b such that the height positions thereof can be accordingly adjusted when a diameter of the spoked wheel 30 to be inspected changes.

The second light source 15 and the second sensor 16 are to detect presence or absence of axial distortion of the rim 33 of the set spoked wheel 30. Attachment positions (attachment heights) of the second light source 15 and the second sensor 16 with respect to the prop 12b are adjusted such that the light L2 output from the second light source 15 is irradiated in a vicinity of a side surface of the rim 33 and this light L2 is received at the second sensor 16. More specifically, a holding member 19 is attached, in a manner being movable up and down, to an upper position of the prop 12b, and the second light source 15 is pivotably attached to the holding member 19 so as to change an emission angle of light. Further, a holding member 20 is attached, in a manner being movable up and down, to a lower position of the prop 12*b*, and the second sensor 16 is attached to the holding member 20 so as to be capable of receiving the light L2 from the second light source 15.

A magnetic sensor 21 is further attached to the holding member 20. This magnetic sensor 21 is to detect a reference position (reference angular position) of the spoked wheel 30 to be inspected. At the inspection, a permanent magnet 22 is adhered to a specific position of an outer circumferential surface of the rim 33 such as a position where an air injection valve is fit in. Then, whenever the permanent magnet 22 comes at an angular position opposed to the magnetic sensor 21 when the spoked wheel 30 is rotated, the magnetic sensor 21 detects a detection signal. Thus, the reference position of the spoked wheel 30 to be inspected, that is, the rim 33, can be detected. Accordingly, it becomes possible that respective spokes 34 can be individually identified based on the detected reference position (a detail of this matter is described later).

The first light source 13, the first sensor 14, the second light source 15, the second sensor 16, and the magnetic sensor 21 are electrically connected to a sensor controlling portion 23. The sensor controlling portion 23 is a control unit controlling light emission of the first light source 13 and the second light source 15 and receiving and processing detection signals of the first sensor 14, the second sensor 16, and the magnetic sensor 21. While this sensor controlling portion 23 is illustrated as a component different from the misalignment detecting device 10, the sensor controlling portion 23 may have a configuration such that the sensor controlling portion 23 is attached to the base 11 and is integrated into the misalignment detecting device 10.

In this embodiment, the base 11 is placed on a pair of foot plates 24 (a foot plate 24 is an elongated member extending in a direction vertical to a paper plane in FIG. 1) and is movable in the direction vertical to the paper plane. Further, the pair of props 12*a*, 12*b* set up on the base 11 are movable to left and right along the base 11 and can change a distance between the props 12*a* and 12*b* conforming to a width of the spoked wheel 30 to be tested.

However, configurations of the base 11, the foot plates 24, and the pair of props 12*a*, 12*b* is not limited to the configurations of this embodiment. For example, the base 11, the foot plates 24, and the pair of props 12*a*, 12*b* may be integrated into a supporting frame so that the spoked wheel 30 can be set to the supporting frame.

A personal computer 25 and a display 26 are connected to the sensor controlling portion 23. A process signal of the sensor controlling portion 23 is provided to the personal computer 25, and an inspection result, a correction instruction, and the like are shown in the display 26.

Figure 4:
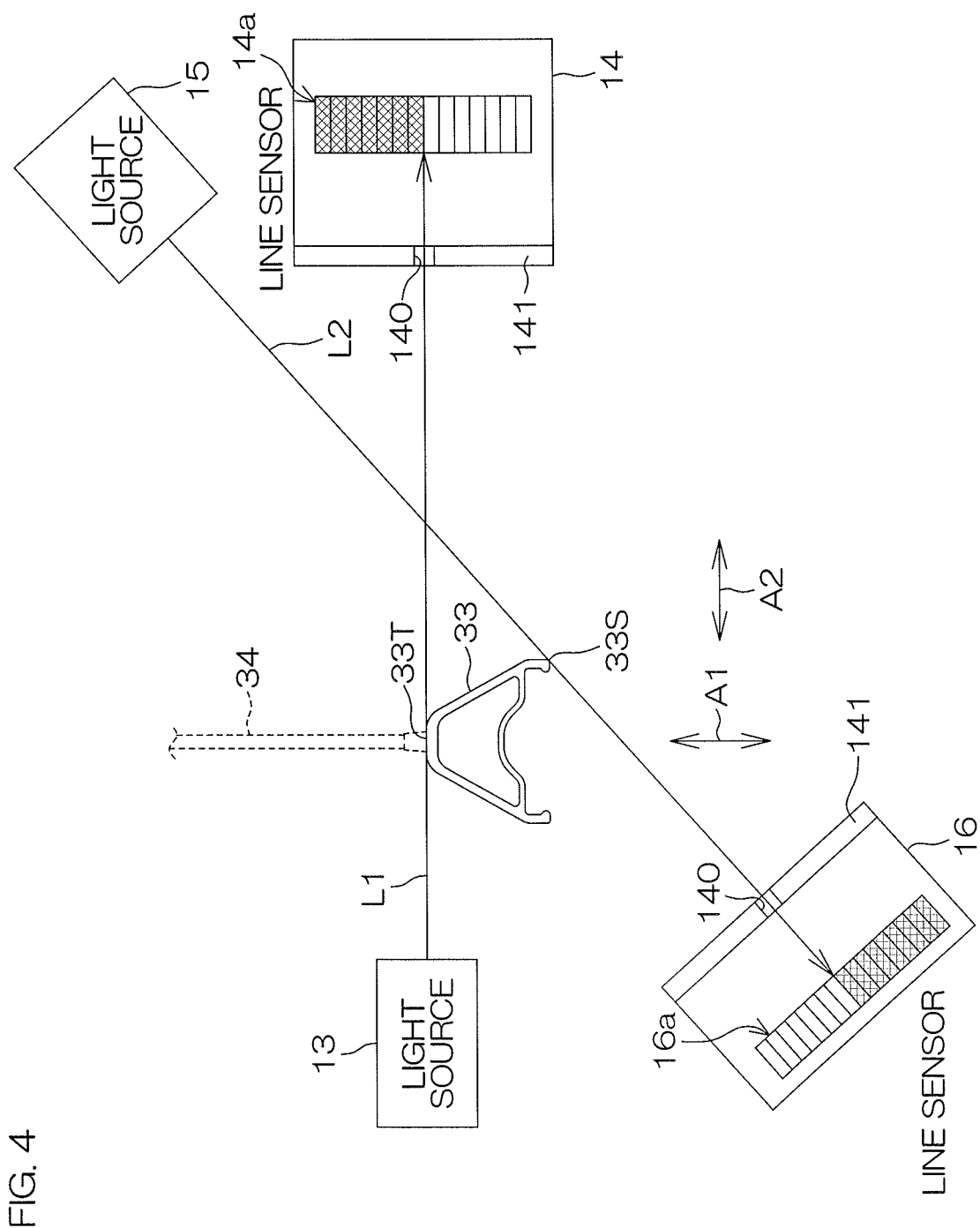
FIG. 4 shows a principle and a configuration of misalignment detection of a rim.

Next, referring to FIG. 4, configurations of the first sensor 14 and the second sensor 16 and a principle of distortion detection of the rim 33 by these sensors 14, 16 are described.

The first sensor 14 is a line sensor for detecting the radial distortion of the rim 33. Thus, the first sensor 14 includes a plurality of photoelectric conversion elements 14*a* arranged linearly in an up and down direction along a radial direction of the rim 33.

In FIG. 4, each photoelectric conversion element 14*a* has a width for the purpose of explanatory convenience but is not limited to such a shape. In short, a line sensor including a number of photoelectric conversion elements 14*a* arranged in a longitudinal direction can be used.

The first light source 13 is configured from LED, for example, and outputs the first detected light L1 toward the first sensor 14. Since the rim 33 is present on a light path of the first detected light L1 which the first light source 13 irradiates, the first detected light L1 passing a portion lower than an inner circumferential edge 33T of the rim 33 is obstructed. Thus, based on whether the rim 33 is in a radially appropriate position or is displaced upward or downward (radially) as shown with an arrow A1, up to which of the plurality of photoelectric conversion elements 14*a* included in the first sensor 14 detects the first detected light L1 is changed.

Thus, a radial position (displacement) of the rim 33 can be detected according to up to which of the plurality of photoelectric conversion elements 14*a* detects light. A pinhole lens (a mere small hole bored in a plate member 141, that is, a pinhole) 140 is provided forward of an incident side of the first sensor 14. This pinhole lens 140 performs image formation (focusing) to the plurality of photoelectric conversion elements 14*a*.

The second sensor 16 is a line sensor for detecting the axial distortion of the rim 33. For this purpose, the second sensor 16 includes a plurality of photoelectric conversion elements 16*a* arranged linearly in an oblique direction with respect to the radial direction of the rim 33. The plurality of photoelectric conversion elements 16*a* may also be any line sensor including a number of photoelectric conversion elements 16*a* arranged linearly in an obliquely lateral direction similar to the plurality of photoelectric conversion elements 14*a*.

The second light source 15 is configured from LED, for example, and outputs the second detected light L2 toward the second sensor 16. Since the rim 33 is present on a light path of the second detected light L2 which the second light source 15 irradiates, the second detected light L2 passing leftward of one side edge 33S of the rim 33 is obstructed. Thus, based on whether the rim 33 is in an axially appropriate position or is displaced rightward or leftward (axially) as shown with an arrow A2, up to which of the plurality of photoelectric conversion elements 16*a* included in the second sensor 16 detects the second detected light L2 is changed.

Thus, an axial position (displacement) of the rim 33 can be detected according to up to which of the plurality of photoelectric conversion elements 16*a* detects light.

The second sensor 16 is also provided with a pinhole lens 140.

When distortion of the rim 33 in the spoked wheel 30 is actually detected, since the spokes 34 are connected at regular intervals to the rim 33 (see FIG. 3), the detected light L1 is intermittently interrupted by the spokes 34 when the spoked wheel 30 to be inspected is rotated. When the spoked wheel 30 is rotated to an angular position where a spoke 34 is on the light path of the detected light L1, the line sensor 14 does not receive light. Thus, by utilizing this characteristic of the line sensor 14, an angular position in a vicinity of each spoke 34 is employed as an angular position for detecting distortion of the rim 33, whereby a distortion detecting position of the rim 33 and the spokes 34 can be associated.

FIG. 5 are explanatory drawings of a measurement principle common to the first sensor 14 and the second sensor 16. In the following, while the first sensor 14 is described, the same measurement principle is also applied to the second sensor 16.

An arrangement relation between the rim 33 to be measured and the sensor 14 is set as shown in FIG. 5(A). That is, a distance between the rim 33 and the pinhole lens 140 is referred to as Lr, and a distance between the pinhole lens 140 and a light-receiving surface of the light-receiving element 14a is referred to as Ls. Then, one pixel of each light-receiving element 14a corresponds to Lr/Ls.

For example, one pixel of the light-receiving element is 0.014 mm. By arranging the light-receiving element in a relation of Lr=2Ls, a resolution of the sensor 14 is 0.028 mm/pixel±0.028.

Thus, sufficient accuracy of a resolution performance for detecting and measuring the radial displacement (distortion) and the axial displacement (distortion) of the rim 33 are obtained. In other words, detection of high precision can be achieved by using a line sensor, a simple sensor of a relatively low price.

FIG. 5(B) shows an output example of the sensor 14 in a state where the rim 33 is displaced downward, and FIG. 5(C) shows an output example of the sensor 14 in a state where the rim 33 is displaced upward.

Figure 6:
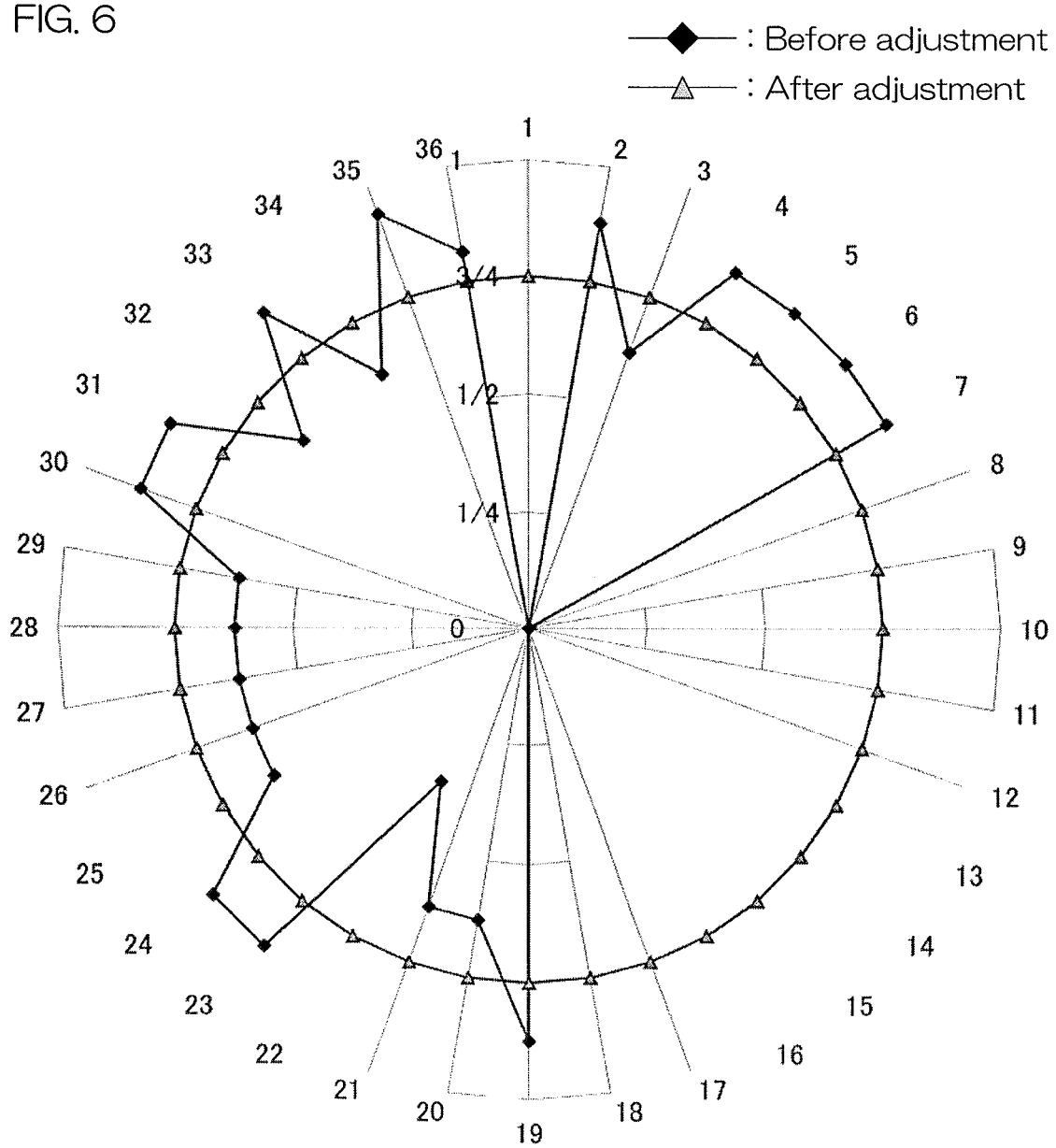
FIG. 6 shows a status indication example before and after an adjustment with respect to radial distortion of a rim 33 measured by the misalignment detecting device 10.

FIG. 6 shows a status indication example before and after an adjustment with respect to the radial distortion of the rim 33 measured by the misalignment detecting device 10. This indication example may be displayed on the display 26 shown in FIG. 1, for example.

With respect to the radial distortion of the rim 33, indication is made on distortion amounts of the rim 33 in vicinities of spoke numbers in association with a count and numbers of the connected spokes 34.

When specifically described, according to a measurement result before the adjustment, a spoke 1 is tensioned too much and a spoke 2 is insufficiently tensioned, and the rim 33 is distorted radially outward at these positions. A spoke 3 is strongly tensioned, and the rim 33 is distorted radially inward at this position. Spokes 4 to 7 are insufficiently tensioned, and the rim 33 is distorted radially outward at these positions. Spokes 8 to 18 are tensioned too much, and the rim 33 is distorted radially inward at these positions. A spoke 19 is insufficiently tensioned, and the rim 33 is distorted radially outward at this position. Spokes 20 to 22 are strongly tensioned, the rim 33 is distorted radially inward at these positions, and their distortion amounts increase from 20 to 21 to 22. Spokes 23 and 24 are insufficiently tensioned, and the rim 33 is distorted radially outward at these positions. Spokes 25 to 29 are strongly tensioned, and the rim 33 is distorted radially inward at these positions. Spokes 30, 31, 33, 35, and 36 are insufficiently tensioned, and the rim 33 is distorted radially outward at these positions. Contrary to this, Spokes 32 and 34 are strongly tensioned, and the rim 33 is distorted radially inward at these positions.

By adjusting the degree of tension of each spoke based on the above measurement result, the radial distortion of the rim 33 can be removed as shown in the measurement result after the adjustment.

Figure 7:
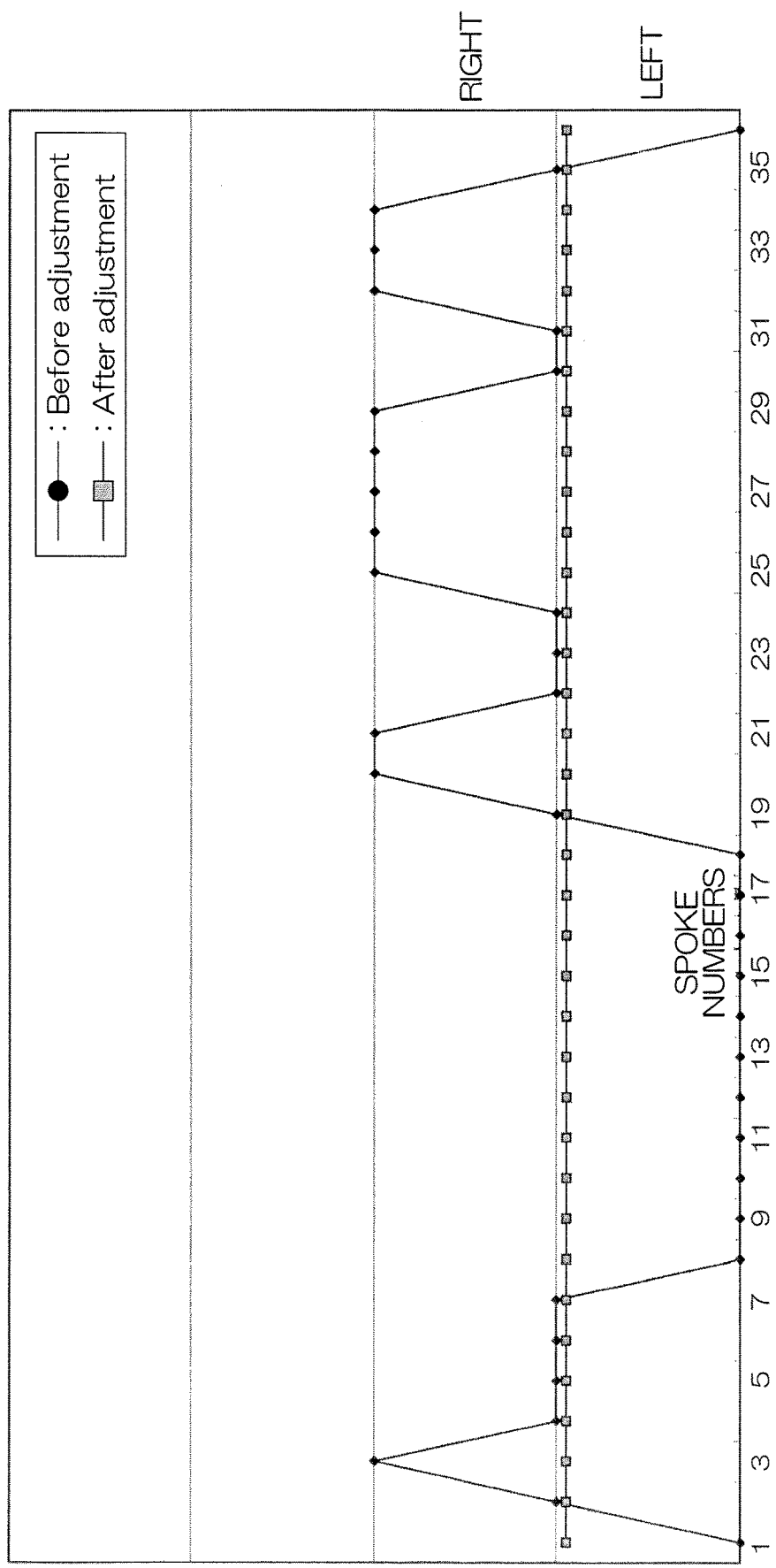
FIG. 7 shows a status indication example before and after an adjustment with respect to axial distortion of the rim 33 measured by the misalignment detecting device 10.

FIG. 7 shows a status indication example before and after an adjustment with respect to the axial distortion of the rim 33 measured by the misalignment detecting device 10. This indication example also may be displayed on the display 26 shown in FIG. 1, for example.

With respect to the axial distortion of the rim 33, too, indication is made on distortion amounts of the rim 33 in vicinities of spoke numbers in association with a count and numbers of the connected spokes 34.

When specifically described, the rim 33 is not distorted axially in vicinities of spokes 2, 4, 5 to 7, 19, 22 to 24, 30, 31, and 35, and the rim 33 is distorted axially rightward in vicinities of spokes 3, 20, 21, 25 to 29, and 32 to 34. Further, the rim 33 is distorted axially rightward in vicinities of spokes 1, 8 to 18, and 36. These are the measurement result.

The rim 33 is distorted axially due to the following reason. That is, while respective other ends of respective spokes are connected to an axial center with respect to the rim 33, respective one ends of these respective spokes are alternatively fixed to an attachment ring on an axially right side or an attachment ring on an axially left side of the hub 31. Thus, the rim 33 is subject to a tension from the axially right side or the axially left side via the spokes. This causes the axial distortion of the rim 33.

Accordingly, also in an adjustment of this distortion, the distortion is removed by adjusting a tension of a corresponding spoke (see the measurement result after the adjustment in FIG. 7).

Figure 8:
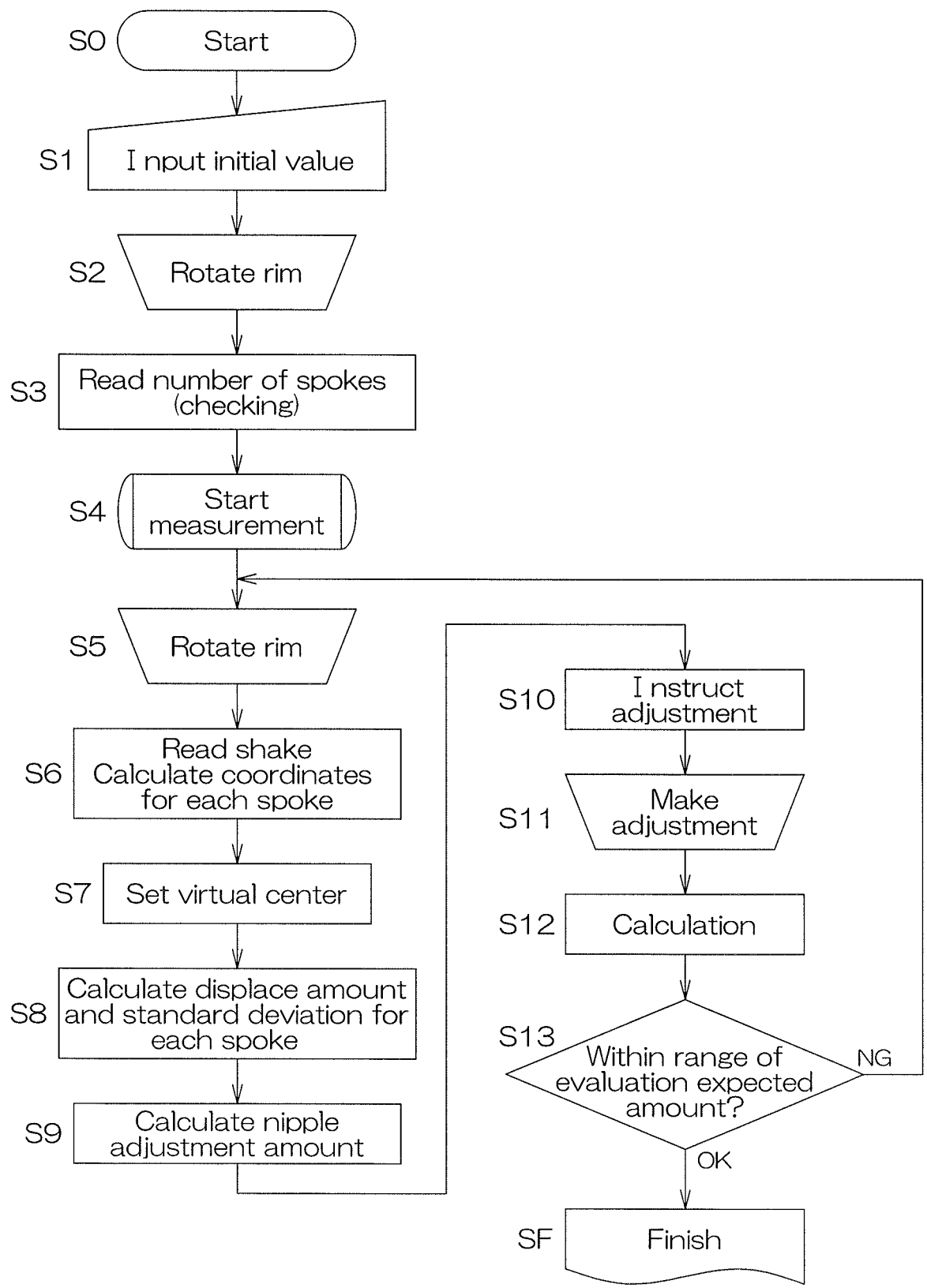
FIG. 8 is a flowchart illustrating processing details using the misalignment detecting device 10.

FIG. 8 is a flowchart for illustrating processing details using the misalignment detecting device 10, the sensor controlling portion 23, the personal computer 25, and the display 26 (see FIG. 1). A process performed by the device shown in FIG. 1 is specifically described according to a flow of FIG. 8.

First, the device is activated (step S0), and default values are input (step S1). The input default values include a rim diameter, a rim width, the number of spokes, and the like of the spoked wheel 30 to be inspected.

Thereafter, the rim 33 of the spoked wheel 30 to be inspected which is set to the hub receiving portion 17 is rotated (step S2). Since this misalignment detecting device 10 does not comprises a driving mechanism for rotating the spoked wheel 30, the rim 33 is rotated manually.

As the rim 33 is rotated, respective spokes 34 connected to the rim sequentially interrupt the light path of the detected light L1 incident on the first sensor 14. Thus, the number of spokes 34 is read (checking) based on an output of the first sensor 14 (step S3).

Then a measurement step is started (step S4), a series of steps in steps S5 to S13 are performed.

When described in detail, the rim 33 is rotated (step S5), and a shake (distortion of the rim 33) is read over an entire circumference of the rim 33, and coordinates of respective spokes are calculated (step S6). In this process of step S6, the permanent magnet 22 is attached to the rim 33 in association with the attachment hole of the air injection valve in the rim 33, for example, as described above. Thus, when the rim 33 is rotated to a position where the permanent magnet 22 is opposed to the magnetic sensor 21, the magnetic sensor 21 emits an output, and the reference position (reference angular position) of the rim 33 is detected. Then, with the reference position of the rim 33 being a standard, angular positions of the rim 33 (coordinates of respective spokes), to which the respective spokes successively detected by the first sensor 14 following rotation of the rim 33 are connected, are detected and calculated.

Further, the angular positions of the rim 33 associated with the respective spokes detected by the first sensor 14 are considered as detected angular positions, and a trigger for detection is output for each of the respective position. The first sensor 14 and the second sensor 16 detect the radial distortion and the axial distortion of the rim 33 (a vertical shake and a horizontal shake of the rim 33) at a timing when the trigger for detection and a predetermined read clock are input simultaneously. Then, these detected outputs are processed by the sensor controlling portion 23 and the personal computer 25.

In the above-described detection of the reference position using the permanent magnet 22 and the magnetic sensor 21, the permanent magnet 22 attached to the rim 33 may be a pair of permanent magnets 22 combining a north pole and a south pole where two magnets of the north pole and the south pole adjacently disposed in a circumferential direction of the rim 33.

When such a permanent magnet 22 having a pair of a north pole and a south pole is used, the magnetic sensor 21 is a composite magnetic sensor utilizing a large Barkhausen jump and can be an energy-saving reference position sensor where a power source is omitted.

Further, a sensor detecting a reference position may be a reference position sensor utilizing the first sensor 14 in place of the above-described magnetic sensor 21. A reference position sensor utilizing the first sensor 14 can be achieved in the following manner.

A light shielding plate having a predetermined width and projecting radially inward from an inner circumferential surface of the rim 33 is set up in association with a specific position of the rim 33, for example, the attachment hole of the air injection valve in the rim 33. Then, when the rim 33 is rotated, detection of the detected light L1 by the first sensor 14 is interrupted whenever the light shielding plate set up at a specific position on the inner circumferential surface of the rim 33 crosses the light path of the detected light L1 emitted from the first light source 13. This angular position of the rim 33 when detection of the detected light L1 is interrupted is detected as the reference position of the rim 33.

By employing such a configuration, detection of the reference position of the rim 33 can also be performed by using the first sensor 14, and a simpler configuration can be achieved.

In step S7, a virtual center of the rim 33 is calculated and set based on the read radial and axial distortions of the rim 33. Then, in relation to the calculated virtual center of the rim 33, the radial distortion (vertical shake) and the axial distortion (horizontal shake), that is, displacement amounts caused in the rim 33, and a standard deviation are calculated in the angular position (coordinates) of each spoke (more strictly speaking, in the detected angular position adjacent to the angular position of each spoke) (step S8).

Then, a nipple adjustment amount for each of the spokes is calculated based on the calculated displacement amount of each of the spokes and the standard deviation (step S9). The nipple adjustment amount for each of the spokes indicates an adjustment amount with which the displacement (the radial distortion and the axial distortion) of the rim 33 at an angular position corresponding to a spoke is eliminated with respect to the spoke by somewhat increasing or decreasing a tension of that spoke.

The calculated nipple adjustment amount for each of the spokes is shown on the display 26 as an adjustment instruction (step S10). This display of a nipple adjustment amount is preferably a display specifically showing a tension adjusting amount for each of the spokes such as "turn the fastening screw 35 of spoke No. n (n is a spoke number) 2.5 times to the right (tightening direction) (or once to the left (loosening direction))". Thus, even a worker without a sufficient experience or skill can correct the shake of the rim 33 appropriately.

After an adjustment is made according to the above-described display of the nipple adjustment amount in step 11, the rim 33 is rotated again and a measuring process is performed (step S12).

As a result of remeasurement, whether or not distortion of the rim 33 after the adjustment is within a range of expected values is evaluated (this evaluation is automatically performed based on a program or a datum preinstalled in the device) (step S13), and when the evaluation is preferable, the process is completed (step SF).

On the other hand, when the evaluation is unpreferable, the processes from step S5 are performed again.

This invention is not limited to the configuration of the above-described embodiment but can be modified variously within the scope of claims. For example, as the detection sensor of the radial distortion of the rim 33 having the first light source 13 and the first sensor 14, one configured of what is called a transmissive sensor, in which the detected light L1 from the first light source 13 is allowed to permeate the rim 33, is shown. However, the detection sensor of distortion of the rim 33 does not need to be a transmissive sensor but may be what is called a reflective sensor where detected light from the light source is reflected on the rim 33 being an object and its reflected light is detected.

Further, in order to make simple the configuration of each line sensor 14, 16, the configuration employing the pinhole lens 140 is illustrated. However, one employing a typical optical lens to form an image may be used.

In this embodiment, the configuration using the two pairs of sensors 14, 16 is proposed. It is generally recognized that a spoked wheel has a characteristic that when a vertical shake (radial distortion) is suppressed, a horizontal shake (axial distortion) is also suppressed. Thus, in a simpler configuration, a misalignment detecting device may employ only a first sensor 14 for detecting a vertical shake (radial distortion).

While the above-described embodiment describes a spoked wheel for a bicycle as an example of spoked wheels, misalignment detection can be performed by using the misalignment detecting device of this invention also to spoked wheels for motorbikes, cast wheels and the like, and spoked wheels for general vehicles.

Further, with respect to a completed bicycle where a spoked wheel is attached to a frame of the bicycle, it is also possible to configure a misalignment detecting device capable of detecting a shake of the attached spoked wheel even when someone climbs on a bicycle.

Figure 9:
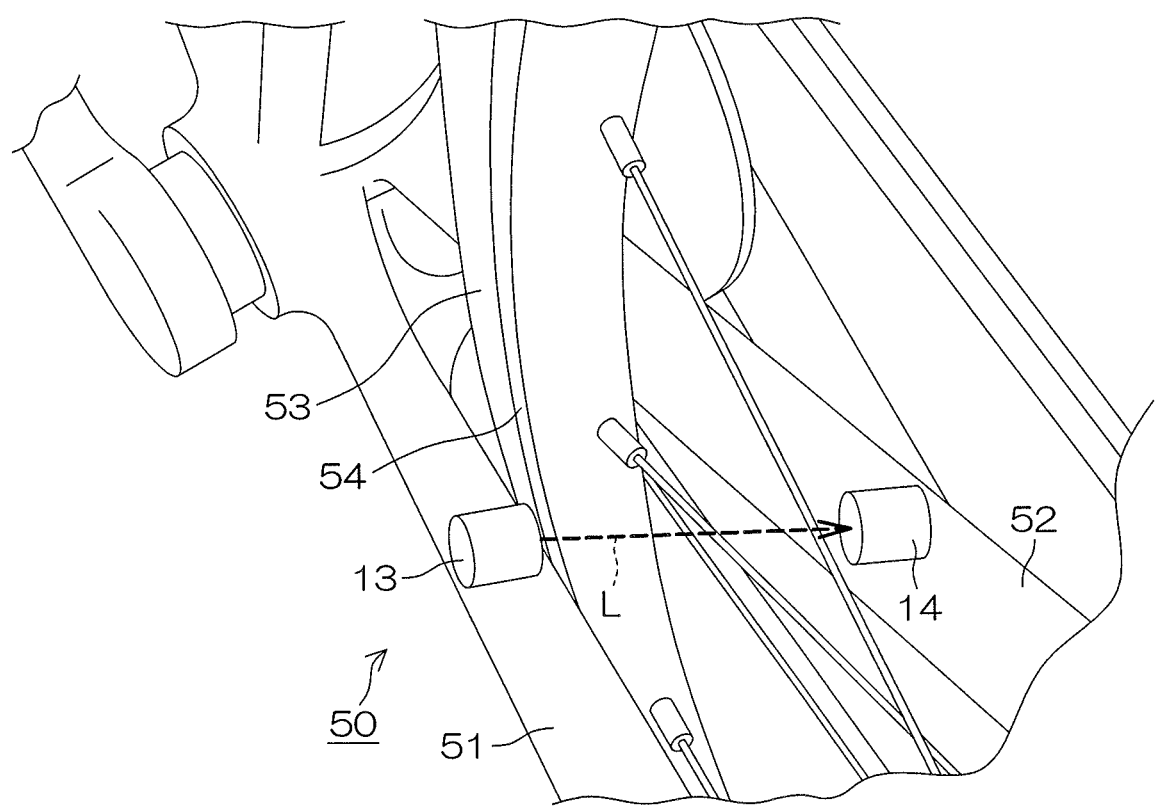
FIG. 9 shows an example of a misalignment detecting device being attachable to an assembled bicycle.

As one example, a light source 13 and a line sensor 14 are respectively attached to frames 51, 52 of a bicycle 50 as shown in FIG. 9. Then, an arrangement is made such that output light from the light source 13 passes one side edge of a rim 54 of a wheel 53. That is, attached positions of the light source 13 and the line sensor 14 to the frames 51, 52 are adjusted such that a light path of detected light L from the light source 13 to the line sensor 14 is diagonal to the rim 54.

Based on a detected output of the line sensor 14, a shake of the wheel 53 can be detected as with the above-described embodiment. In this case, it is preferable that the detected output can be output-displayed by using other electronic device such as a speedometer attached to a handlebar and the like of the bicycle 50, for example.

LIST OF REFERENCE NUMERALS 10 misalignment detecting device
11 base
12a, 12b prop
13 first light source
14 first sensor
14a, 16a photoelectric conversion element
15 second light source
16 second sensor
17 hub receiving portion
18 groove
19, 20 holding member
21 magnetic sensor
22 permanent magnet
23 sensor controlling portion
24 foot plate
25 personal computer
26 display
30 spoked wheel
31 hub
32 wheel shaft
33 rim 34 spoke
35 fastening screw
140 pinhole lens
141 plate member
L1 first detected light
L2 second detected light

What is claimed is:

1. A misalignment detecting device for inspecting a spoked wheel, the device including:
    a supporting frame to support the spoked wheel to be inspected;
    a first light source that is attached to the supporting frame and that irradiates first light to the spoked wheel on the supporting frame in an axial direction of the spoked wheel;
    a first line sensor that is attached to the supporting frame to detect the first light and to provide an output indicative of radial distortion of the spoked wheel, without contact, based on the detected first light;
    a second light source that is attached to the supporting frame and that irradiates second light to the spoked wheel on the supporting frame in a direction intersecting the axial direction of the spoked wheel;
    a second line sensor that is attached to the supporting frame to detect the second light and to provide an output indicative of axial distortion of the spoked wheel, without contact, based on the detected second light; and
    a processing unit that performs predetermined calculation based on the outputs of the first line sensor and the second line sensor to detect misalignment of the spoked wheel.

2. The misalignment detecting device according to claim 1, wherein
    the spoked wheel includes a hub serving as a rotation center, a rim surrounding a circumference of the hub with a predetermined interval, and a plurality of spokes, one end of each of which is secured to the hub and the other end of each of which is connected to the rim,
    the radial distortion indicated by the output of the first line sensor is a radial distortion of the rim to the hub, the first line sensor including a plurality of photoelectric conversion elements arranged linearly in a radial direction of the rim, and
    the axial distortion indicated by the output of the second line sensor is an axial distortion of the rim to the hub, the second line sensor including a plurality of photoelectric conversion elements arranged linearly in a direction intersecting the radial direction of the rim.

3. The misalignment detecting device according to claim 2, wherein each of the first line sensor and the second line sensor includes a pinhole lens for forming on a photoelectric conversion element surface, an image of an object by the detected light.

4. The misalignment detecting device according to claim 1, wherein the first line sensor outputs a trigger signal that is associated with a position of the rim to which each other end of each of the spokes is connected and that instructs reading of detected light at the associated position.

5. The misalignment detecting device according to claim 4, further including a reference position sensor for detecting a reference position of the rim of the spoked wheel on the supporting frame and providing an output indicative thereof,
    wherein the processing means imparts a spoke number to the position associated to the rim position to which each other end of the spokes is connected based on the output of the reference position sensor.

6. The misalignment detecting device according to claim 5, wherein the processing unit performs the predetermined calculation based on the outputs of the first line sensor and the second line sensor and the output of the reference position sensor, and outputs for each spoke an adjustment value by which tension is to be adjusted.

* * * * *